Dec. 20, 1932.  E. L. HOFFMAN  1,891,418
AERIAL SAFETY STRAP
Filed Aug. 6, 1930
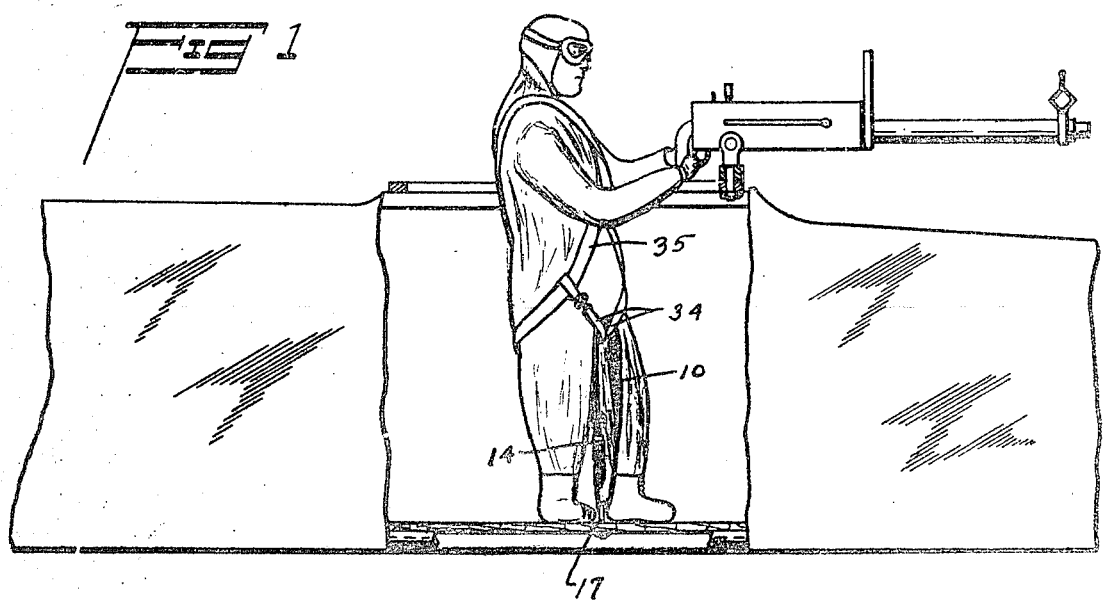
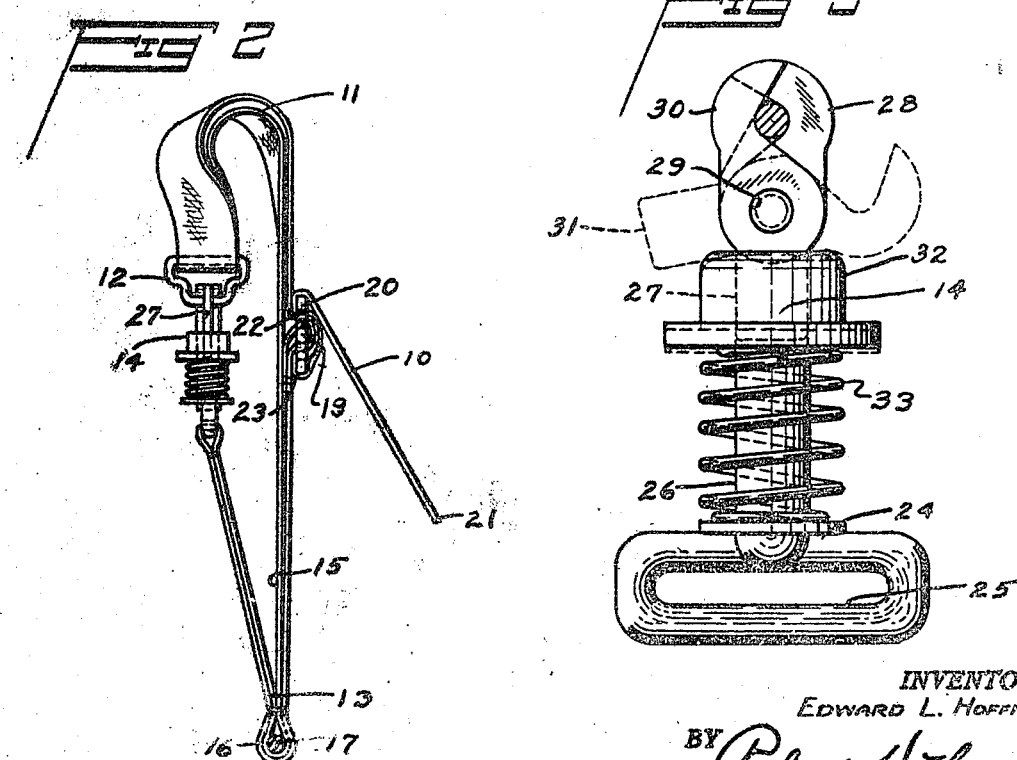
INVENTOR
EDWARD L. HOFFMAN Patented Dec. 20, 1932

1,891,418

UNITED STATES PATENT OFFICE

EDWARD L. HOFFMAN, OF DAYTON, OHIO

AERIAL SAFETY STRAP

Application filed August 6, 1930. Serial No. 473,417.

(GRANTED UNDER THE ACT OF MARCH 3, 1883, AS AMENDED APRIL 30, 1928; 370 O. G. 757)

The invention described herein may be manufactured and used by or for the Government for governmental purposes, without the payment to me of any royalty thereon.

The present invention relates generally to aerial safety straps and more particularly to straps adapted to be worn by gunners, observers, photographers, and the like, wherein the nature of their work requires them to stand in the aircraft.

Heretofore there has been in use for this purpose a belt of substantial width, which was adapted to encircle the chest of the wearer. This belt is provided on opposite sides with two straps each having snap fastenings provided on their free ends, which were for the purpose of attaching the straps to the tourelle of Scarff mount used for machine guns. Safety belts of this general character were found to have many disadvantages, chief among which was lack of freedom of movement in the cockpit inasmuch as it was necessary for the wearer to turn the gun mount in order to turn around himself. Unless the adjustment of the belt was very loose the wearer had difficulty in mounting the steps provided in the cockpit, which it was necessary to mount in order to shoot over the side of the aircraft and downwardly.

On the other hand it was found necessary to wear the belt with the anchoring straps tightly adjusted in order to insure that the aviator would not be thrown out of the belt, his safety in this event being dependent solely upon his intuition to quickly grasp his hips below the belt in order to prevent himself from slipping entirely out of the safety belt.

The primary object therefore of the present invention is to overcome the above deficiencies by providing an aerial safety strap or belt so constructed as to permit great freedom of movement, comfort, and security to the wearer under any and all conditions.

Another object of the present invention is to provide an aerial safety strap adapted to be attached at its lower end to the floor portion of the aircraft and at its upper end to the parachute body harness worn by the aviator. A safety strap of this general construction permits the aviator to brace himself when firing the guns inasmuch as his two legs and the floor anchored strap form a tripod arrangement.

A further object of the present invention is to provide an aerial safety strap having means provided thereon which permit the wearer to quickly release himself when necessary by means of one hand.

A further object of the present invention is to provide an aerial safety strap which attaches directly to the body harness of the aviator or gunner. In this manner, in the event of sudden maneuvers of the aircraft wherein the aviator is apt to be thrown from it, the restraining load is taken through the parachute harness and particularly on the shoulder straps of the harness instead of by the circular chest belt heretofore used.

The invention is further characterized by providing in an aerial safety strap of the above-mentioned general character, a novel releasing device constructed in such a manner that it is positively and quickly releasable under even a heavy load, which device when once released remains in such released position so that only one clamping motion is necessary to lock it.

A belt constructed in accordance with my invention also contemplates the provision of a simple and easily effected adjustment so as to accommodate gunners or other wearers of different height, such adjusting means being arranged so as to carry the full strength of the strap without slipping.

Lastly, the invention contemplates the provision of an aerial safety strap which may be retained as part of the equipment necessary to the aircraft, which therefore eliminates the necessity of each aviator carrying as additional personal equipment a safety strap upon entering or leaving the aircraft.

The various features of novelty whereby my invention is characterized will hereinafter be pointed out with particularity in the claims, but for a full understanding of my invention and its objects and advantages, reference may be had to the following detailed description taken in connection with the accompanying drawing, in which:

Fig. 1, for illustrative purposes, is a side view of an aerial gunner wearing a parachute body harness showing the adaptation of the aerial safety strap constructed in accordance with my invention attached thereto.

Fig. 2 is an enlarged detail view of the strap per se.

Fig. 3 is an enlarged detail view of the releasable locking means provided on the safety strap.

Referring more particularly to the drawings wherein corresponding parts are designated by like numerals throughout the several views thereof, the aerial safety strap in the preferred embodiment of my invention herein illustrated comprises generally a strap 10 having an upper looped portion 11, carrying a terminal fitting 12, and a lower looped portion 13, carrying a releasable locking mechanism 14, which cooperates with the terminal fitting 12 in a manner to be described more in detail hereinafter. The one side 15 of the strap 10 is common to both looped portions. The lower portion 16 of the safety strap is adapted to be anchored to the floor or any other substantial part of the aircraft by means of an anchoring member 17 as shown in Fig. 1. One free end of the safety strap is attached to the center part 19 of the adjusting member 20, the other end 21 of the strap being adapted to be threaded through the adjusting member in the manner illustrated in detail in Fig. 2, which consists essentially in passing the free end 21 of the strap underneath the top part 22 of the adjusting member over the center part 19 and thereafter underneath the bottom part 23, lastly passing the end of the strap over the center part 19 and again underneath the top part 22, heretofore mentioned, a sufficient length of strap being provided to allow for adjustment purposes. In this manner a quick and positive adjustment of the strap can be made to accommodate it to wearers of different heights.

The release mechanism 14 heretofore mentioned and shown in detail in Fig. 3, comprises generally a base portion 24 having an opening 25 provided therein for the reception of the looped portion 13, heretofore mentioned, said base portion carrying a stem 26 slotted at its upper end as shown by numeral 27 to receive the clamping jaw 28 therein, the latter being pivotally mounted to the stem 26 as shown by numeral 29. Clamping jaw 28 is adapted to cooperate with a second clamping jaw 30 provided on the end of the stem 26 and when in a locked condition will assume the position illustrated in full lines in Fig. 3. The clamping jaws are so shaped and co-act in such fashion as to receive and hold the terminal fitting 12 when the device is in a locked position. Clamping jaw 28 is also provided with a locking arm 31 which when in the locked position illustrated in Fig. 3 lies fully within the slot 27.

A locking sleeve 32 slidably mounted on a stem 26 normally engages and holds the locking arm 31 within the slot 27 provided in the stem 26, this due to the action of the spring 33, which is arranged to bear against the locking sleeve at its one end and against a shoulder of the base portion 24 at its other end. In this manner the clamping jaw 28 is maintained in locked position with respect to the clamping jaw 30 and prevents removal of the terminal fitting 12. To release the clamping jaws it is only necessary to manually force the locking sleeve downwardly against the action of the spring and in so doing the locking arm 31 is released and the clamping jaw 28 is forced open and assumes the dotted line position illustrated in Fig. 3, thus permitting removal of the terminal fitting 12. It will be apparent by observing Fig. 3 that the clamping jaw 28 is maintained in an open position by the locking sleeve when once released.

In operation the terminal fitting 12 with its accompanying strap portion may be looped preferably through the leg strap 34 of the parachute harness 35 in the manner illustrated in Fig. 1, thereafter being locked in the locking mechanism 14.

In this manner it will be apparent that the aviator is thus securely anchored to the aircraft and that he may quickly disengage himself by pushing downward on the locking sleeve in the manner heretofore described.

While I have illustrated and described the preferred form of construction for carrying my invention into effect it is to be understood that variations and modifications may be had without departing from the spirit of the invention.

I therefore do not wish to be limited to the precise details of construction set forth, but desire to avail myself of such variations and modifications as may fall within the scope of the appended claims.

Having thus described my invention, what I claim as new and desire to secure by Letters Patent is:

1. A safety device for aircraft, comprising, in combination, means of looped formation having separable portions, a quickly releasable fastening device for securing said separable portions together, one of said portions being adapted for connection with the leg straps of a parachute body harness or the like, the other portion being permanently secured to the floor of said aircraft.

2. In an aircraft, an aerial safety device comprising in combination, a strap having an upper looped portion connected to the body harness of an aviator and a lower looped portion secured to the floor portion of said aircraft and locking means quickly releasable for connecting the ends of said looped portions together to secure said aviator to said aircraft.

3. In an aircraft, an aerial safety device comprising in combination, a strap having an upper looped portion adapted for encircling the leg straps of the body harness of an aviator, and a lower looped portion directly secured to the floor of the fuselage or said aircraft, and a quickly releasable locking mechanism for connecting the ends of said looped portions together to secure said aviator in said aircraft.

4. In an aircraft, an aerial safety device, comprising in combination, a strap having separable looped portions one of said looped portions being attached to the body harness of an aviator the other looped portion being adapted for attachment to the floor of said aircraft and a quickly releasable fastening device interconnecting the ends of said looped portions for releasably securing said aviator in said aircraft.

5. In an aircraft, an aerial safety device, comprising in combination, a separable strap having an upper looped portion adapted for encircling the leg straps of the body harness of an aviator and a lower looped portion attached to the floor of the fuselage of said aircraft and a quickly releasable locking mechanism for connecting the free ends of said looped portions together to fixedly secure said aviator in said aircraft, said mechanism comprising two members, one of said members being provided with a plurality of clamping jaws, the other member being formed with a cross bar adapted to be engaged by the clamping jaws of said first-mentioned member, and a locking sleeve operating to normally maintain the clamping jaws in locked position.

6. In an aircraft, an aerial safety device comprising in combination a separable strap having an upper looped portion adapted for encircling the leg straps of the body harness of an aviator and a lower looped portion attached to the floor of the fuselage of said aircraft and a quickly releasable locking mechanism for connecting the free ends of said looped portions together to fixedly secure said aviator in said aircraft, said mechanism comprising two members, one of said members being provided with a plurality of clamping jaws, the other member being formed with a cross bar adapted to be engaged by the clamping jaw of said first-mentioned member and a spring controlled locking sleeve operating to normally maintain said clamping jaws in locked position.

7. In an aircraft, an aerial safety device comprising in combination a separable strap having an upper looped portion adapted for encircling the leg straps of the body harness of an aviator and a lower looped portion attached to the floor of the fuselage of said aircraft, and a quickly releasable locking mechanism for connecting the free ends of said looped portions together to fixedly secure said aviator in said aircraft, said mechanism comprising two members, one of said members being provided with a stem carrying a plurality of clamping jaws, one of said clamping jaws being pivotally mounted relative to the other, the other member being formed with a cross bar adapted to be engaged by the clamping jaws of said first-mentioned members, and a spring control locking sleeve slidably mounted on said stem and cooperating with said pivoted clamping jaw to normally maintain said jaws in a locked position.

8. In an aircraft, an aerial safety device comprising in combination a separable strap having an upper looped portion adapted for encircling the leg straps of the body harness of an aviator and a lower looped portion attached to the floor of the fuselage of said aircraft and a quickly releasable locking mechanism for connecting the free ends of said looped portions together to fixedly secure said aviator in said aircraft, said mechanism comprising two members, one of said members being provided with a stem carrying a plurality of clamping jaws, one of said clamping jaws being pivotally mounted relative to the other and carrying a locking arm, the other member being formed with a cross bar adapted to be engaged by the clamping jaws of said first-mentioned member, and a spring controlled locking sleeve slidably mounted on the stem of said first-mentioned member and operating to normally encompass the locking arm of said pivoted clamping jaw to maintain said clamping jaws in a locked position.

9. In an aircraft, an aerial safety device, comprising in combination a separable strap having an upper looped portion adapted for encircling the leg straps of the body harness of an aviator and a lower looped portion attached to the floor of said fuselage of said aircraft, and a quickly releasable locking mechanism for connecting the free ends of said looped portions together to fixedly secure said aviator in said aircraft, said mechanism comprising two members, one of said members being provided with a stem carrying a plurality of clamping jaws, one of said clamping jaws being pivotally mounted relative to the other and carrying a locking arm, the other member being formed with a cross bar adapted to be engaged by the clamping jaws of said first-mentioned member, and a spring controlled locking sleeve slidably mounted on the stem of said first-mentioned members and operating to normally encompass the locking arm of said pivoted clamping jaw to maintain said clamping jaw in a locked position, said locking jaws being releasable by a longitudinal sliding movement of said locking sleeve on said stem.

10. In an aircraft, an aerial safety device comprising in combination a strap having an upper looped portion connected to the body harness of an aviator, and a lower looped portion secured to the floor of said aircraft, a quickly releasable locking mechanism for connecting the ends of said looped portions together to secure said aviator in said aircraft and an adjusting fitting interconnecting the free ends of said strap to adjust said strap for different lengths.

11. An aerial safety strap for aircraft comprising an upper looped portion and a lower looped portion, the upper looped portion being adapted for encircling the lower straps of a parachute harness, the lower looped portion being secured to the floor of said aircraft and locking means quickly releasable for connecting the ends of said looped portions together.

12. An aerial safety device for an aircraft comprising a strap having separable looped portions, one of said looped portions being adapted to encircle the leg straps of a parachute body harness, the other looped portion being adapted to be secured to the floor of said aircraft and a quickly releasable locking device for connecting the ends of said separable portions together to releasably secure said harness to said aircraft.

13. An aerial safety device for an aircraft comprising a strap having separable portions and free ends, one of said separable portions being adapted to encircle the leg straps of a parachute body harness, the other portion being adapted to be secured to the floor of said aircraft, a quickly releasable locking device for connecting the ends of said separable portions together and an adjusting fitting interconnecting the free ends of said strap for increasing or decreasing the effective length of said strap.

In testimony whereof I affix my signature.

EDWARD L. HOFFMAN.